Oct. 19, 1926.
A. BOYNTON
1,603,835
WELL CEMENTING DEVICE
Filed Dec. 21, 1925
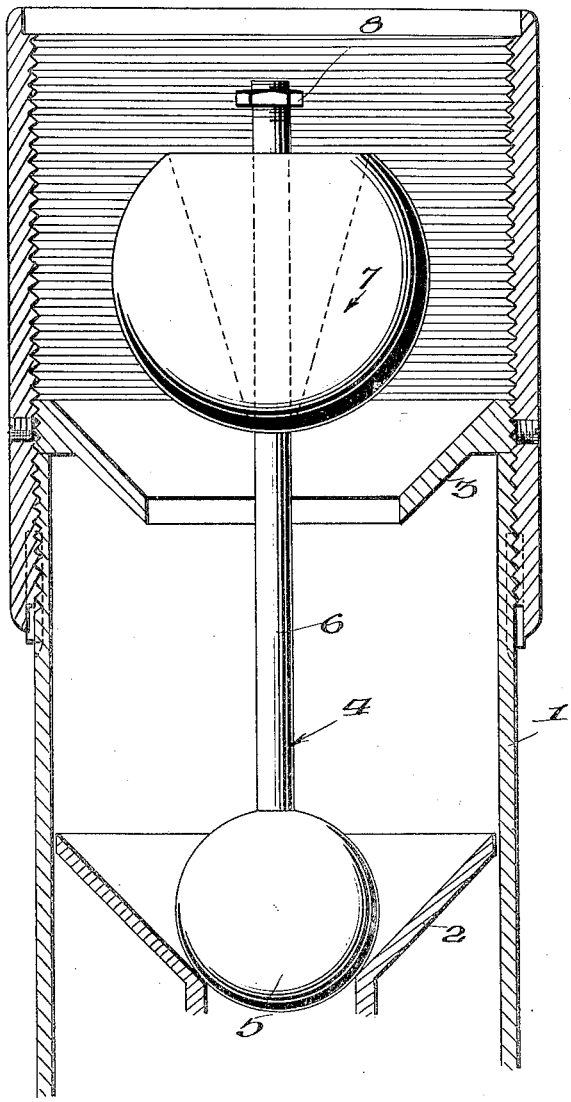
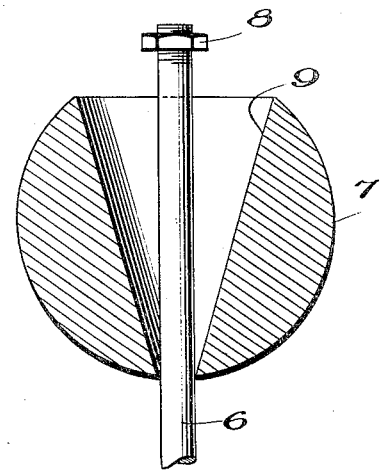
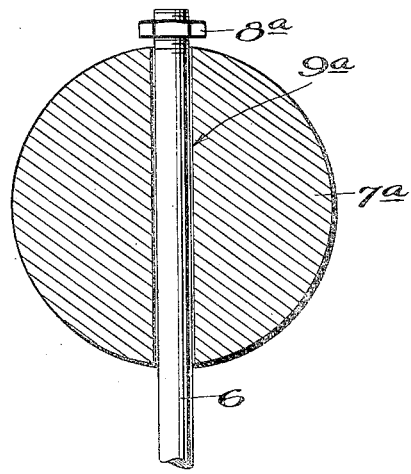
WITNESSES
INVENTOR
A. BOYNTON,
BY
ATTORNEYS Patented Oct. 19, 1926.

1,603,835

UNITED STATES PATENT OFFICE.

ALEXANDER BOYNTON, OF SAN ANTONIO, TEXAS.

WELL-CEMENTING DEVICE.

Application filed December 21, 1925. Serial No. 76,841.

This invention relates in general to a cementing device for use in carrying out the methods forming the subject-matter of my co-pending applications filed October 1, 1925, Serial Numbers 59,887 and 59,888 and more particularly relates to an improvement in the valve assembly used in this type of cementing device and method.

The object of the invention is to provide a valve which will insure the prevention of further flow of cement at the proper time and also effect the stalling of the pump to advise the operator that the cementation has been completed.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a view illustrating the combined signal and valve co-operating with the seating arrangement provided therefor in the cementing device, Figure 2 is a sectional view of the auxiliary or movable valve employed in Figure 1, and Figure 3 shows a slight variation of this form of valve.

Referring to the drawings the numeral 1 designates generally a cementing device of the type forming the subject-matter of my co-pending application executed under even date herewith and identified as Case No. 1. This cementing device has valve seats 2 and 3 with which the combined signal and valve, designated generally at 4, is co-operable. The valve includes a main valve member 5 having the form of a ball and fastened to the lower end of a stem 6. A movable valve member 7 also having the approximate form of a ball is slidably mounted on the stem 6, the valve member 7 having an opening therethrough accommodating the stem 6. Displacement of the movable ball valve member 7 from the stem 6 is prevented by means of a nut 8 threaded on the upper end of the stem 6.

In the form of the invention shown in Figures 1 and 2 the movable valve member 7 has a conical opening 9 therein which permits the valve member 7 to rock to properly engage the seat 3 and which also prevents the valve member 7 from freezing or sticking on its stem 6.

In the form of the invention shown in Figure 3 the ball valve member is designated at 7ª and has a diametrically cylindrical opening 9ª therein, in which the valve stem 6 is loosely fitted.

The entire valve assembly is lighter than cement and heavier than the mud fluid. The ball valve member 5 is slightly heavier than the liquid cement but the movable valve member 7 is lighter than the liquid cement.

If the valve member 5 fails to properly engage its seat 2 the valve member 7 will be forced down on its seat 3 by the flow of the mud fluid. The valve member 7 is slightly heavier than the mud fluid though lighter than the liquid cement.

I claim:—

1. A cementing device for use with a well casing having a pair of spaced valve seats and comprising a valve assembly including a ball valve member, a stem fixed thereto, and a second ball valve member having an opening larger than the stem and receiving the stem so that the second ball valve member possesses a certain amount of limited free motion relative to the stem, said ball valve members being co-operable with the seats of the well casing.

2. In a cementing device having a pair of valve seats, a valve assembly including a ball valve member, a stem fixed thereto, and a second ball valve member slidably fitted on the stem, said second ball valve member having a conical opening in which the stem is fitted.

3. In a cementing device for use with a well casing having a pair of spaced valve seats, a valve assembly having a specific gravity less than liquid cement and greater than mud fluid and comprising a main ball valve member having a specific gravity slightly greater than the cement, a stem fixed thereto, an auxiliary ball valve member slidably fitted on the stem and having a specific gravity less than cement and greater than the mud fluid, and means for preventing displacement of the movable valve member from its stem.

ALEXANDER BOYNTON.